March 23, 1965  C. W. JOHNSTON  3,174,235
SHOE HEEL SHOCK ABSORBER
Filed Oct. 16, 1964
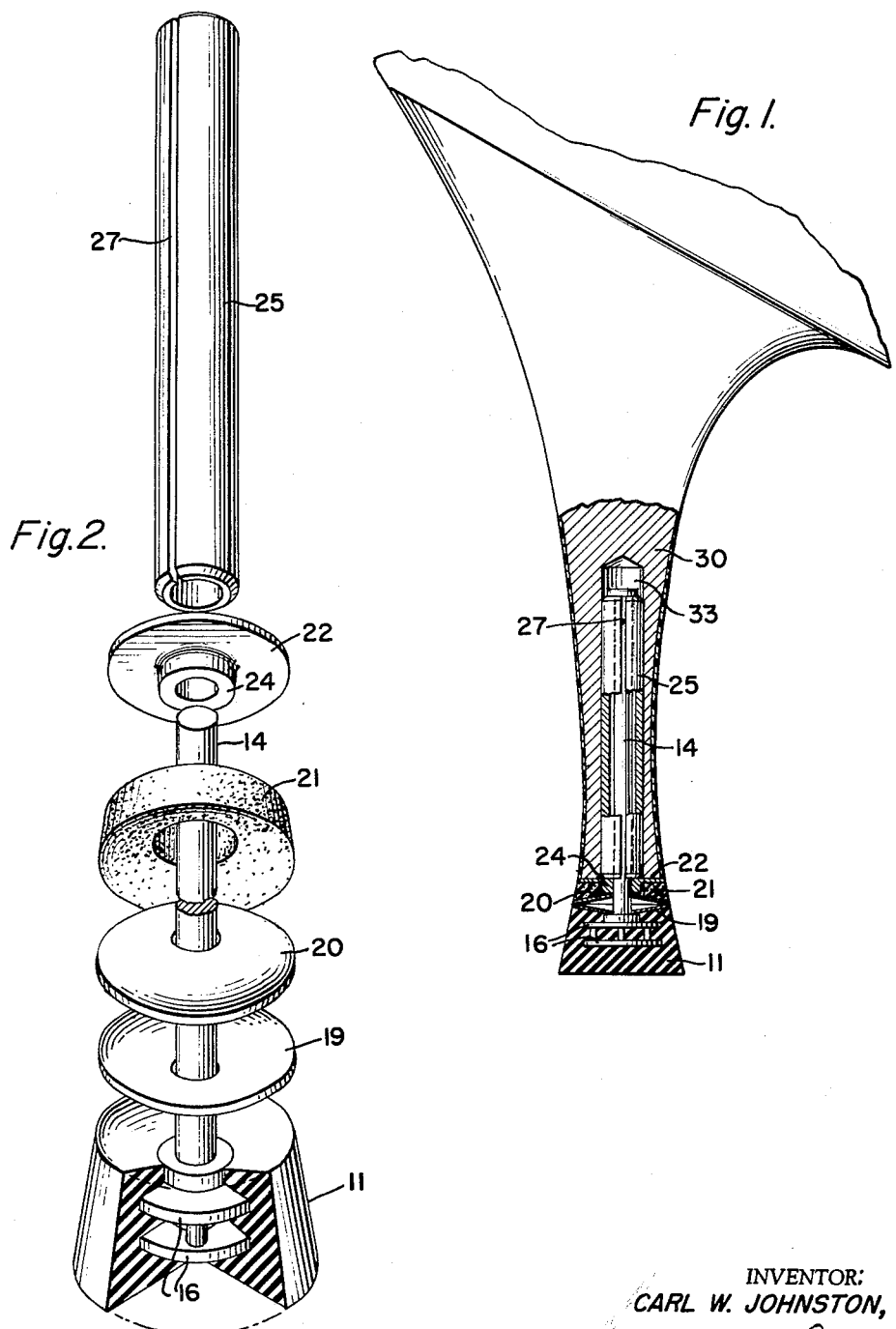
INVENTOR:
CARL W. JOHNSTON,
BY
ATTORNEY.

United States Patent Office 3,174,235
Patented Mar. 23, 1965

3,174,235
SHOE HEEL SHOCK ABSORBER
Carl W. Johnston, 868 Victor Ave., Inglewood, Calif.
Filed Oct. 16, 1964, Ser. No. 404,307
12 Claims. (Cl. 36—36)

This invention relates to a shoe heel shock absorber and more particularly to such a device suitable for use with high heeled ladies shoes.

High heeled ladies shoes, while of unquestionable aesthetic value, tend to impart a good deal of shock force on the heel of the wearer which can be quite discomforting and fatiguing. Devices have been provided in the prior art to cushion such heels, but these have been either overly complicated and expensive in their construction, fail to provide the proper type of cushioning action (e.g., have too high or too low a spring rate), or do not lend themselves to installation in the field on existing heels. Further, some of the devices of the prior art necessitate the use of cavities in the heel portion in which, for example, coil springs may be contained. The existence of large cavity areas in such heels tends to lessen the structural integrity thereof and this becomes especially undesirable in the case of spike type high heels which are quite thin and therefore often relatively weak to begin with.

The device of this invention overcomes the shortcomings of prior art cushioning devices in providing a simple yet highly effective cushioning structure which can readily be installed on existing heels in the field. Ideal cushioning action is provided and this end result is achieved without significantly lessening the structural strength of the heel.

The desired end result is achieved in the device of the invention by utilizing a Belleville washer assembly to provide resilient cushioning action. This Belleville washer assembly is mounted on a spike to which the heel lift portion is fixedly attached, such spike being retained within elongated retainer means fitted in the body of the heel.

It is therefore an object of this invention to provide an improved shock absorber device for shoe heels.

It is a further object of this invention to provide a shock absorber for heels of simpler and more economical construction than similar prior art devices.

It is still another object of this invention to provide a shock absorber for heels which readily lends itself to installation in the field on existing shoes.

It is still a further object of this invention to provide a shock absorber which provides ideal cushioning action for ladies high heels.

It is still a further object of this invention to provide a shock absorber for ladies high heels, the installation of which does not materially lessen the structural integrity of such heels.

Other objects of this invention will become apparent from the following description taken in connection with the accompanying drawings of which FIG. 1 is an elevation view partially in cross section of a preferred embodiment of the device of the invention, and FIG. 2 is an exploded view of the shock absorbing mechanism of the preferred embodiment shown in FIG. 1.

Referring to the figures, lift portion 11 which may be fabricated of hard polyurethene, rubber or any other suitable material, is fixedly attached to the end of spike member 14 by forming such material when it is in its plastic state around retainer portion 16 of the spike member which is integrally formed with such spike member. Belleville washers 19 and 20, which are dish shaped and of resilient springy material such as spring steel or beryllium copper, are slidably mounted on spike member 14 in external concentricity therewith. The washers are mounted with their concave surfaces facing each other. Mounted on spike member 14 above Belleville washer 20 is elastomeric washer 21, which is fabricated of a soft material such as rubber or polyurethene foam. Washer 21 has a concave bottom face which mates with the convex top surface of Belleville washer 20. Metal spacer member 22 also mounts on spike member 14 in external concentricity therewith, spacer 22 having a lip portion 24 which fits within washer 21. Finally, at the top of the stack and surrounding spike member 14 is roll pin 25 which has a longitudinal slot 27 formed therein.

In installing the device of the invention in a shoe heel 30, a cavity 33 suitable for accommodating roll pin 25 in a press tight fit is first formed in the heel. The various components are then installed on spike 14 in the sequence indicated in FIG. 2. The top end of spike 14 is then peened over, thereby slidably retaining roll pin 25 on the spike with all the other elements being held on the spike below the roll pin. Roll pin 25 is then force fitted into aperture 33. Roll pin 25 thus retains spike 14 and the components mounted thereon on heal 30. When pressure is placed on lift 11 in walking, spike 14 is slidably urged upward in cavity 33 against the resilient spring action of the Belleville washer assembly comprised by Belleville washers 19 and 20. Elastomeric washer 21 acts as a filler to keep out dirt and other foreign objects from entering the assembly which might impair its proper operation. Spacer member 22 helps to retain washer 21 in position and provides bottoming action for the spring assembly formed by the Belleville washers.

As can be seen, the device of the invention detracts nothing from the aesthetic qualities of the heel nor does it significantly diminish the structural integrity of same in view of the strengthening structure provided by both the roll pin and the spike which run substantially throughout the entire cavity formed in the heel. The resilient action provided by the Belleville washer assembly is ideal in that it provides good cushioning yet is not overly resilient as some of the devices of the prior art utilizing coil springs. Further, the device of the invention is of relatively simple and economical construction and can be readily installed in the field with a minimum amount of modification to existing heels.

While the device of the invention has been described and illustrated in detail it is to be clearly understood that this is intended by way of illustration and example only and is not to be taken by way of limitation, the spirit and scope of this invention being limited only by the terms of the following claims.

I claim:

1. A shoe heel shock absorber device comprising
   a spike member,
   a lift member fixedly attached to one end of said spike member,
   Belleville washer assembly means slidably mounted on said spike member in external concentricity therewith and adjacent to said lift member, and
   a hollow cylindrical pin member mounted on said spike member in external concentricity therewith,
   the other end of said spike member being formed to slidably retain said pin member and said Belleville washer assembly means on said spike member, said pin member being adapted to be force fitted into an elongated cavity formed in a shoe heel.

2. The device as recited in claim 1 wherein said washer assembly means comprises a pair of Belleville washers, the concave surfaces of said washers facing each other.

3. The device as recited in claim 1 and additionally including an elastomeric washer slidably mounted on said spike member in external concentricity therewith and adjacent to said Belleville washer assembly means.

4. A shoe heel shock absorber device comprising
a spike member,
a lift member fixedly attached to one end of said spike member,
resilient means slidably mounted on said spike member in external concentricity therewith and adjacent to said lift member,
an elastomeric washer assembly slidably mounted on said spike member in external concentricity therewith and adjacent to said resilient means,
a spacer member mounted on said spike member in external concentricity therewith and adjacent to said washer assembly, and
a cylindrical hollow pin member mounted on said spike member in external concentricity therewith and adjacent to said spacer member,
the other end of said spike member having retainer means formed thereon to slidably retain said pin member, said spacer member, said washer assembly and said resilient means on said spike member, said pin member being adapted to be force fitted into an elongated cavity formed in a shoe heel.

5. The device as recited in claim 4 wherein said resilient means comprises a Belleville washer.

6. The device as recited in claim 4 wherein said pin member is a roll pin.

7. A shoe heel shock absorber device comprising
a spike member,
a lift member fixedly attached to one end of said spike member,
Belleville washer assembly means slidably mounted on said spike member in external concentricity therewith and adjacent to said lift member,
elastomeric washer assembly slidably mounted on said spike member in external concentricity therewith and adjacent to said Belleville washer assembly means,
a spacer member mounted on said spike member being in external concentricity therewith and adjacent to said washer member, and
a roll pin member mounted on said spike member in external concentricity therewith and adjacent to said spacer member,
the other end of said spike member being peened to slidably retain said roll pin member, said spacer member, said washer member and said Belleville washer assembly means on said spike member, said roll pin member being adapted to be force fitted into an elongated cavity formed in a shoe heel.

8. The device as recited in claim 7 wherein said Belleville washer assembly means comprises a pair of dish-shaped Belleville washers mounted with their concave surfaces facing each other, said elastomeric washer assembly comprising a dish-shaped washer mounted with its concave surface in mating engagement with the convex surface of one of said Belleville washers.

9. In combination,
a shoe heel having an elongated cylindrical cavity formed therein and a shock absorber device for such shoe heel comprising
a cylindrical spike member,
a lift member fixedly attached to one end of said spike member,
a dish-shaped Belleville washer having an aperture at the center thereof, said washer being mounted on said pin member in external concentricity therewith,
a dish-shaped elastomeric washer having an aperture therein mounted on said spike member in external concentricity therewith, the concave surface of said washer mating with the convex surface of said Belleville washer, and
an elongated hollow cylindrical pin member mounted on said spike member in external concentricity therewith,
said Belleville washer, said elastomeric washer, and said pin member being slidably retained on said spike member,
said pin member being force fitted into the elongated cavity in said heel,
whereby when pressure is applied against the end of said lift member, said spike member is forced to slide further into said cavity against the resilient outward urging of said Belleville washer.

10. The combination as recited in claim 9 and additionally including a disc-shaped spacer member having an aperture at the center thereof, said spacer member being mounted on said spike member between said pin member and said elastomeric washer.

11. The combination as recited in claim 9 wherein the other end of said spike member is peened to retain said pin member thereon.

12. In combination,
a shoe heel having an elongated cylindrical cavity formed therein and a shock absorber device for such shoe heel comprising
a cylindrical spike member,
a lift member fixedly attached to one end of said spike member,
a first dish-shaped Belleville washer having an aperture at the center thereof, said washer being mounted on said pin member in external concentricity therewith,
a second Belleville washer similar to said first Belleville washer mounted on said spike member in external concentricity therewith, the concave portions of said Belleville washers facing each other,
a dish-shaped elastomeric washer having an aperture therein mounted on said spike member in external concentricity therewith, the concave surface of said elastomeric washer mating with the convex surface of said second Belleville washer,
substantially disc-shaped spacer means having an aperture in the center thereof mounted on said spike member in external concentricity therewith and adjacent to said elastomeric washer, and
an elongated roll pin member mounted on said spike member in external concentricity therewith and adjacent to said spacer means,
said Belleville washers, said elastomeric washer, said spacer means and said roll pin member being slidably retained on said spike member,
said roll pin member being force fitted into the elongated cavity in said heel,
whereby when pressure is applied against the end of said lift member, said spike member is forced to slide further into said cavity against the resilient outward urging of said Belleville washers.

References Cited by the Examiner
UNITED STATES PATENTS

| | | | |
|---|---|---|---|
| 2,330,102 | 9/43 | Yarnall | 153—38 X |
| 2,807,100 | 9/57 | Windle | 36—38 X |
| 2,935,800 | 5/60 | Ronci | 36—42 |
| 3,043,024 | 7/62 | Haug | 36—36 |

JORDAN FRANKLIN, *Primary Examiner.*